United States Patent

MacNab

[11] 4,321,494
[45] Mar. 23, 1982

[54] AIR-GAP WINDING IN AN ELECTRICAL MACHINE

[75] Inventor: Robert B. MacNab, Windisch, Switzerland

[73] Assignee: BBC Brown, Boveri & Company, Ltd., Baden, Switzerland

[21] Appl. No.: 757,332

[22] Filed: Jan. 6, 1977

Related U.S. Application Data

[63] Continuation of Ser. No. 587,618, Jun. 17, 1975, abandoned.

[30] Foreign Application Priority Data

Jun. 25, 1974 [CH] Switzerland ..................... 8656/74

[51] Int. Cl.³ .............................................. H02K 7/10
[52] U.S. Cl. ..................................... 310/179; 310/43; 310/45; 310/184; 310/194
[58] Field of Search .................. 310/178, 179, 43, 45, 310/266, 180, 64, 192, 184, 65, 198–208, 213, 216, 218, 254, 258, 259

[56] References Cited

U.S. PATENT DOCUMENTS

| | | | |
|---|---|---|---|
| 2,790,099 | 4/1957 | Nyyssonen | 310/202 |
| 3,082,337 | 3/1963 | Horsley | 310/258 |
| 3,529,192 | 9/1970 | Davies | 310/202 |
| 3,538,364 | 11/1970 | Favereau | 310/43 |
| 3,725,708 | 4/1973 | Possis | 310/43 |

Primary Examiner—R. Skudy
Attorney, Agent, or Firm—Burns, Doane, Swecker & Mathis

[57] ABSTRACT

An air-gap winding within an electrical machine is arranged with the conductors thereof extending in the axial direction of the machine and are embedded in an electrically insulating cylinder which serves as the winding support. The conductors, or at least some of them, are concentrated into conductor bundles which lie approximately upon a cylindrical surface extending between the inner and outer surfaces of the winding support and coaxially with the latter. The conductors of the bundles are electrically associated with the one or more phases of the machine winding and the number of conductors of each bundle associated with a particular phase satisfies the equation $N_{LP}=C$, where C is any whole number constant, the value of which lies between zero and number $N_L$ of the conductors of that bundle.

7 Claims, 13 Drawing Figures

AIR-GAP WINDING IN AN ELECTRICAL MACHINE

This is a continuation of application Ser. No. 587,618, filed June 17, 1975, now abandoned.

The present invention relates to an air-gap winding in an electric machine, of which the conductors extending in the axial direction of the machine are embedded in an electrically insulating cylinder serving as winding support.

Air-gap windings of the type referred to, which are used more particularly in superconductive generators, have been part of the prior art for some time (see e.g.: "Fully Slotless Turbogenerators" by E. Spooner, Proc. IEE, Vol 120, No. 12, December 1973). The air-gap windings referred to substantially fulfil the role of the customary stator windings in which individual voltages are generated in the conductors distributed in various grooves on the stator circumference, which are then added, their phase position being taken into consideration (see Bodefeld and Sequenz "Elektrische Maschinen", Sixth edition, pages 163–169, and R. Oberholzer "Konstruktion elektrischer Maschinen", II Synchronmaschinen, Pages 18–40). The resultant voltage of such a stator winding is smaller than that represented by the number of the conductors times the voltage of one conductor. The algebraic sum of the individual voltages must therefore still be multiplied by a factor in order to obtain the actual voltage, (geometric sum). This factor $\xi$, which is determined by the geometrical design of the winding, is designated the winding factor and is generally composed of three factors, namely the group factor, the grooving factor, and the chording factor conjointly.

In the case of unchorded windings, in which the two coil sides of a coil are separated by one pole division $\tau_p$, the winding factor is composed of the group factor and the grooving factor and is $$\xi = \frac{\sin q\alpha/2}{q \sin \alpha/2} \cdot \frac{\sin \delta\theta/2}{\delta\theta/2} \quad \text{where} \tag{1}$$

q is the number of grooves per pole and phase, $\alpha$ is the electric angle, which corresponds to the product of the number of pairs of poles p times the mechanical angle $\alpha_{mech}$ between two adjacent grooves, i.e., $\alpha = p\alpha_{mech}$, and $\delta\theta$ is the conductor width, expressed in units of angle.

In the case of chorded windings, where a shortening or lengthening of step is made in order to suppress specific harmonics in the voltage curve and the two coil sides of a coil are no longer one pole division $\tau_p$, the winding factor of a phase is $$\xi = \frac{\sin q\alpha/2}{q \sin \alpha/2} \cdot \frac{\sin \delta\theta/2}{\delta\theta/2} \cdot \sin \frac{\omega}{\tau_p} \cdot \frac{\pi}{2} \quad \text{where} \tag{2}$$

w is the coil width, also called the winding step, in groove divisions.

$\tau_p$ is the pole pitch, in groove division, and q, $\alpha$ and $\delta\theta$ have the connotations already stated.

The factor $k_p = \sin W/\tau_p \pi/2$ is designated the chording factor and the ratio $s = W/\tau_p$ as the chording The harmonic winding factor of the $\nu$-th harmonic of an unchorded winding is $$\xi = \frac{\sin \nu q\alpha/2}{q \sin \nu \alpha/2} \cdot \frac{\sin \nu\delta\theta/2}{\nu\delta\theta/2} \tag{3}$$

whereas the harmonic winding factor of the $\nu$-th harmonic of a chorded winding is $$\xi = \pm \frac{\sin \nu q\alpha/2}{q \sin \nu \alpha/2} \cdot \frac{\sin \nu\delta\theta/2}{\nu\delta\theta/2} \cdot \sin \nu \frac{\omega}{\tau_p} \cdot \frac{\pi}{2} \tag{4}$$

where the positive sign is valid for $\nu = 1,5,9,13\ldots$ the negative sign is valid for $\nu = 3,7,11,15\ldots$ and $\xi_\nu = 0$ is valid for $\nu = 0,2,4,6\ldots$.

For the prior art winding arrangements, "two layer windings" are frequently adopted, in which two coil sides are arranged superposed in each groove. One coil side of a coil occupies the top layer in the groove, whereas the other coil side occupies the bottom layer in the associated groove. In unchorded windings the two conductors of a groove belong to the same phase, whereas in chorded windings the two conductors of many grooves belong to different phases (see R. Oberholzer, Page 26).

In the case of the air gap winding of a dynamo-electric machine described in Swiss Pat. No. 347,571, the conductors are arranged at equal mutual angular intervals in the cross-sectional surface of the winding support, likewise in two layers, on the circumferences of two concentric circles. Again, in this arrangement, two conductors arranged superposed may be associated either with the same phase or with two different phases.

Considered from the standpoint of the distribution of the conductors available among three phases of mutually similar construction, both the conventional two-layer windings accommodated in grooves of the stator stampings, and also the air-gap winding described in the Swiss Patent Specification referred to are disadvantageous. With both of these arrangements, the only possibilities are to distribute the conductor cross-section arranged on a radial line so that:

(a) the total conductor cross-section belongs to the same phase, (b) the one half of the said conductor cross-section belongs to one phase, and the other half to another phase.

Thus, where an arrangement of the type referred to is chosen, the choice is restricted to one of these two possibilities, which then has a direct and frequently undesirable influence upon the harmonics content of the phase.

In fact the harmonics content of a phase, and hence the pattern of the voltage curve generated and its deviation from a sine oscillation, the losses occurring at the rotor surface, and the winding factors are dependent upon the distribution of the conductor cross-section along the circumference of the circle upon which they are arranged. One may speak of a distribution function which expresses the conductor cross-section, or the number of the conductors, in terms of their position on the circumference of the said circle. It would, of course, be desirale to be able to choose this distribution function as required, or according to the desiderata relating to the harmonic content, so as to satisfy the various conditions which arise in practice. This, however, has not been accomplished in any of the prior art arrangements.

It is the aim of the invention to obviate the disadvantages of the prior art and to produce an air-gap winding of the type initially referred to, in which the conductors are arranged in the winding support in such a way that their distribution among phases of mutually similar construction can be made at least approximately according to a predetermined distribution function satisfying the particular desiderata in respect of the harmonics content of the phases.

This aim is achieved according to the invention in that at least some of the conductors are concentrated as conductor bundles, that the conductor bundles lie at least approximately on at least one cylinder surface which extends between the outer surface and the inner surface of the winding support coaxially to the latter, that the conductors of each bundle are associated with one or more phases, and that the number $N_{LP}$ of the conductors of each bundle which are associated with one phase satisfies the formula $N_{LP}=C$, where C is any whole number constant, the value of which is between zero and the number $N_L$ of the conductors of the relevant bundle, i.e. $O \leq C \leq N_L$.

According to a preferred embodiment of the invention, the conductor bundles lie on a single cylinder surface which extends in the center between the outer surface and the inner surface of the winding support. With this arrangement a maximum moment of inertia of the winding support wall cross-section is obtained, and hence a maximum rigidity of the winding support which is necessary to prevent vibrations, and also maximum strength and hence optimum resistance of the winding support to the mechanical forces acting during service and to the short-circuit forces which may possibly appear.

Generally speaking, the conductors extending in the axial direction of the machine and embedded into the wall of the winding support make little contribution to the said moment of inertia, and are therefore considered as cavities for the present purposes. The further away from the bending axis of the threatened winding support wall cross-section the conductors, or the cavities representing these conductors, are arranged, the greater is the negative influence which they exert upon the moment of inertia of the cross-section—i.e. the smaller is the said moment of inertia and hence the resistance to any flattening of the winding support which may possibly appear due to the effect of the short-circuit forces.

In the preferred embodiment mentioned, the conductor bundles are arranged as close as possible to the bending axis of the winding support wall cross-section, so that they detract as little as possible from the moment of inertia. By optimum utilization of the winding support wall cross-section, it is at the same time possible to accommodate a larger overall conductor cross-section or a greater number of conductors in the winding support, which is of considerable importance from the standpoint of the current load capacity and the power of the machine.

Exemplary embodiments of the object of the invention are explained hereinbelow with reference to the accompanying drawing, wherein.

Identical components are designated by the same reference numerals in the figures of the drawing.

Figure 1:
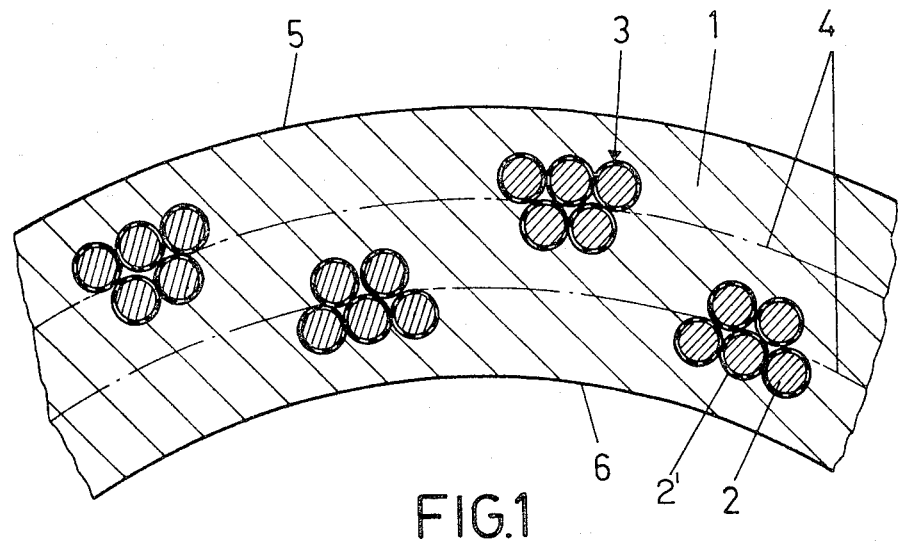
FIG. 1 shows a partial section through a winding support according to a first embodiment of the invention, in which the bundles exhibit five conductors each.

In FIG. 1, in the winding support 1 the conductors 2 are arranged in bundles 3 which lie upon the cylinder surfaces 4 which extend between the outer surface 5 and the inner surface 6 of the winding support 1 coaxially to the latter and to each other. The number $N_L$ of the conductors 2 per bundle 3 is five, but this number could likewise be larger or smaller. The number $N_L$ of the conductors 2 per bundle 3 is the same along the circumferences of both cylinder surfaces 4 in FIG. 1. In order to permit the distribution of the available conductors among three precisely mutually equal phases, the number $N_B$ of the bundles 3 on each cylinder surface 4 is a number divisible by six in the case of a three-phase winding. In general, the number $N_B$ of the bundles 3 on each cylinder surface 4 must be a whole multiple of twice the number of the phases.

If convenient, the number $N_L$ of the conductors 2 per bundle 3 may vary along the circumference of a cylinder surface 4. Furthermore, individual conductors, or no conductors at all, may be provided in individual angular positions. In such cases, it is necessary in order to permit the distribution of the conductors into precisely mutually equal phases, for the number of those bundles 3 which exhibit mutually equal numbers of conductors 2 on each cylinder surface 4 to be a whole multiple of twice the number of the phases. This restriction also refers to the number of the individual conductors and empty angular positions which may possibly be present per cylinder surface 4.

It should also be pointed out that the conductors 2 may be constructed as hollow conductors if this is necessary for the purpose of cooling them.

Figure 2:
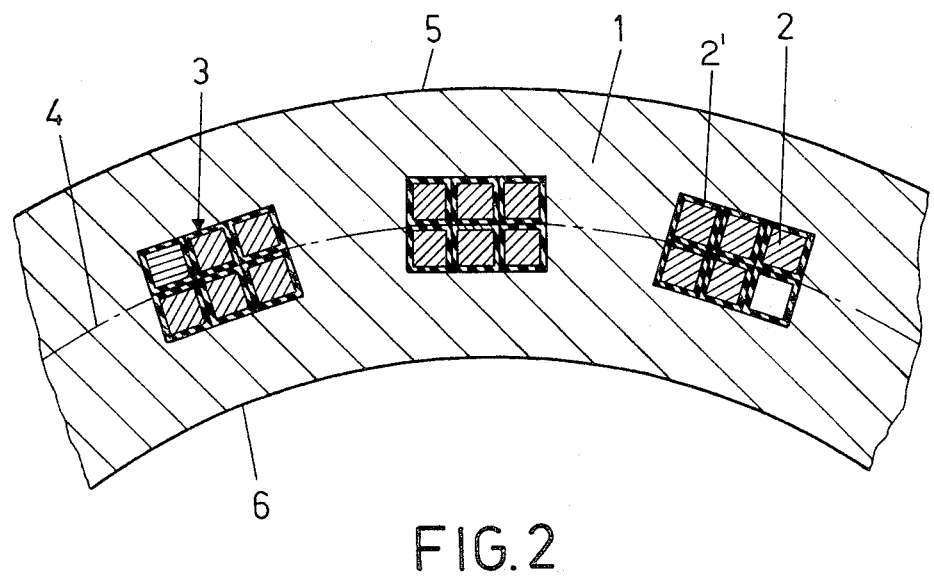
FIG. 2 shows a partial section through a winding support according to a second and preferred embodiment of the invention, in which the bundles exhibiting six conductors are arranged on a single central cylinder surface.
Figure 3:
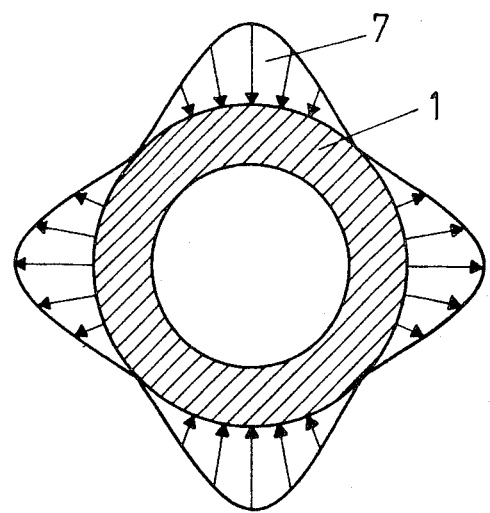
FIG. 3 shows a section through a winding support with the components of the mechanical forces, variable in the peripheral direction, which are particularly dangerous in their influence upon said winding support during service.

In the preferred embodiment of the winding illustrated in FIG. 2, the bundles 3 arranged on a single central cylinder surface 4 each consist of six square conductors 2. As has already been pointed out, the arrangement of the conductors 2 in the winding support cross-section has a direct influence upon the moment of inertia of the winding support wall (in longitudinal section) and hence upon the rigidity of the winding support 1 and upon its strength. The mechanical force components 7 illustrated in FIG. 3 and acting upon the winding support 1 are particularly dangerous because they vary continually in the peripheral direction during service and can cause undesirable vibrations if the rigidity of the winding support 1 is insufficient. In addition, a maximum strength of the winding support 1 is required so that it presents sufficiently great resistance to any flattening caused by short-circuit forces which may possibly act upon it.

Figure 4:
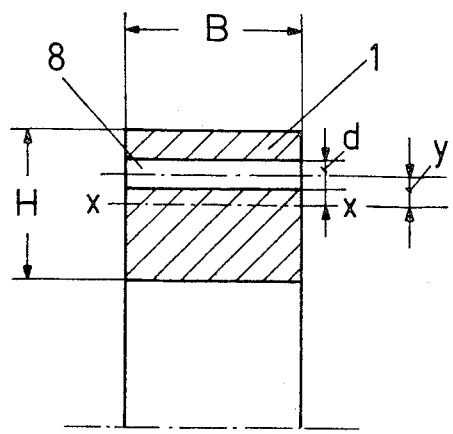
FIG. 4 shows a longitudinal section through a section of the winding support wall, in which a conductor passing through it is represented as a cavity.

The conductors 2 are embedded in the winding support 1, which is generally manufactured of concrete or of glass-fibre reinforced plastics, and since they make little contribution to the moment of inertia of the cylinder wall (in longitudinal section), as already mentioned they are replaced for the purposes of the strength calculations by cavities which reduce the strength of the winding support with regard to flattening. A cavity 8 of this type, such as it occurs in the prior art arrangement at an interval y from the axis of symmetry x—x of the winding support cross-section is illustrated in FIG. 4. The moment of inertia $I_{x-x}$ of the cross-section with reference to the axis x—x is calculated, as is known, by the formula $$I_{xx} = \frac{BH^3}{12} - \frac{Bd^3}{12} - Bdy^2$$

For the present preferred embodiment, y is chosen approximately zero, so that the moment of inertia $I_{xx} = B/12 \ (H^3 - d^3)$ assumes its maximum value. By optimum utilization of the cross section, a maximum rigidity and a maximum strength of the winding support are achieved, together with the possibility of accommodating a maximum total conductor cross-section in the winding support.

Figure 5:
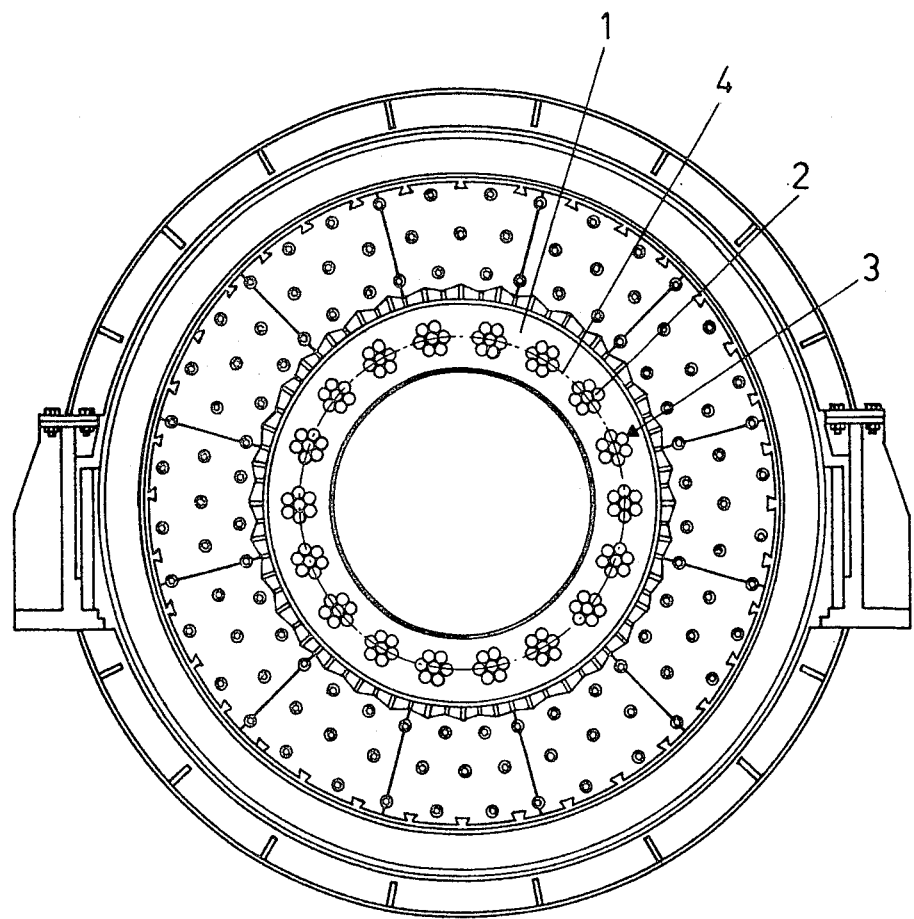
FIG. 5 shows a cross-section through a stator with a winding support constructed according to the invention, which likewise exhibits conductor bundles consisting of seven conductors and embedded in the winding support.

FIG. 5 shows the general arrangement of a stator with air-gap winding which is constituted by the winding support 1 and the conductor bundles 3, each exhibiting seven conductors 2, embedded in the same. This arrangement has been found to be particularly advantageous.

One substantial advantage of the winding arrangement according to the invention is the fact that by concentrating the conductors 2 into bundles 3—i.e. into groups each with a plurality of conductors 2, the conductors can be distributed among the different phases so that any desired fractions of a bundle 3 are associated with the different phases. The number $N_{LP}$ of the conductors 2 of each bundle 3 which are associated with one phase therefore satisfies the formula $N_{LP} = C$, where C is any desired whole number constant, the value of which is between zero and the number $N_L$ of the conductors 2 of the relevant bundle 3. In this manner it is possible to distribute the existing conductors 2 among the existing phases in accordance with virtually any desired distribution function, whereby much more favorable values of the harmonics content and hence of the winding factors and of the losses can be achieved. This will be demonstrated mathematically hereinbelow by means of a comparison of the winding factors of the winding arrangement according to the invention with those of a conventional two-layer winding arrangement.

The mathematical relationships listed earlier for the calculation of the winding factors are valid for conventional two-layer windings and can be used for such. However, the said relationships are no longer valid for a winding arrangement in which the conductors are concentrated into bundles and the number of the conductors associated with a phase varies along the circular circumference on which they lie in accordance with a distribution function. If a winding arrangement according to the invention is to be compared with a conventional winding arrangement with regard to the harmonic winding factors, then it is first of all necessary to develop mathematical relationships by means of which is it possible to calculate the winding factors for the winding arrangement according to the invention. Such relationships are developed hereinbelow.

Figure 7:
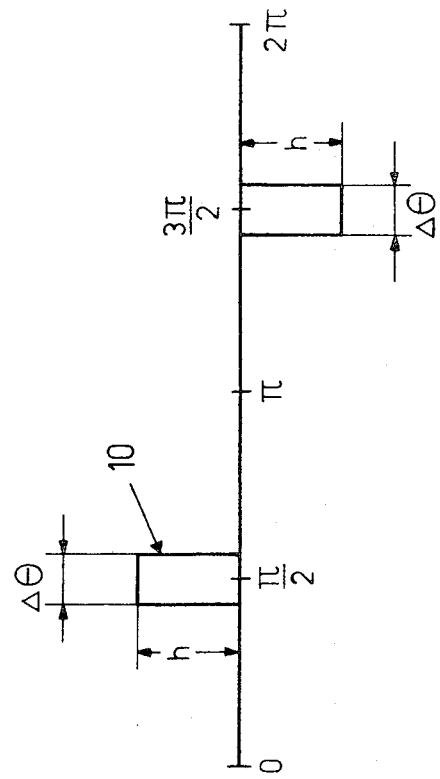
FIG. 7 shows the mathematical representation of the winding arrangement according to FIG. 6, which is the distribution function of the total conductor cross-section.
Figure 6:
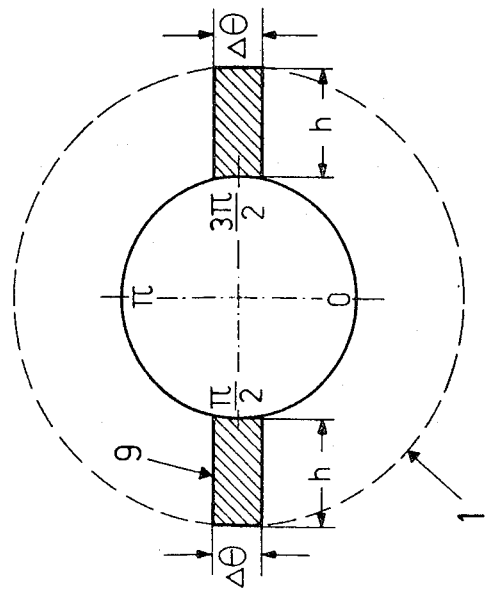
FIG. 6 shows a single-phase reference winding arrangement, in which the total conductor cross-section is arranged concentrated on a diameter of a winding support.

First of all we adopt as basic a theoretical single-phase winding arrangement which is designated as reference winding 9 hereinbelow, the total conductor cross-section of which is arranged concentrated in a winding support 1 in the angular positions $\pi/2$ and $3\pi/2$, as illustrated in FIG. 6. The mathematical representation of this concentrated winding selected as reference winding 9 is illustrated in FIG. 7 and exhibits two strips 10 displaced by 180° relative to one another each of which represent a conductor cross-section with "normalized" cross-sectional surface $\pi$. The width of the strip 10 is designated by $\Delta\theta$, whilst its height is designated h. Consequently, $h\Delta\theta = \pi$, or $h = \pi/\Delta\theta$. The distribution function $f_b(\theta)$ of the reference winding 9 in the range from zero to $\pi$ is therefore given by the expression $$f_b(\theta) = \begin{cases} 0, & 0 < \theta < \frac{\pi}{2} - \frac{\Delta\theta}{2} \\ \frac{\pi}{\Delta\theta}, & \frac{\pi}{2} - \frac{\Delta\theta}{2} < \theta < \frac{\pi}{2} + \frac{\Delta\theta}{2} \\ 0, & \frac{\pi}{2} + \frac{\Delta\theta}{2} < \theta < \pi \end{cases} \quad (5)$$

This discontinuous function $f_b(\theta)$ will now be developed in the form of an infinite Fourier series. The amplitudes of the even harmonics of the function $f_b(\theta)$ are all zero, whereas those of the odd harmonics correspond to the relevant Fourier coefficients $B_{vb}$, where $v$ is the ordinal number of the harmonic and b is the index which refers to the reference winding 9. The Fourier coefficients $B_{vb}$ are calculated in accordance with the known formula (see E. Kreyszig: "Advanced Engineering Mathematics", Wiley 1962, page 447):

$$B_{vb} = \frac{2}{\pi} \int_0^\pi f_b(\theta) \sin_v \theta \, d\theta \quad (6)$$

For the function $f_b(\theta) = \frac{\pi}{\Delta\theta}, \frac{\pi}{2} - \frac{\Delta\theta}{2} < \theta < \frac{\pi}{2} + \frac{\Delta\theta}{2}$ (7)

it is true that $\frac{\pi}{2} + \frac{\Delta\theta}{2} B_{vb} = \frac{2}{\pi} \left[ -\frac{\pi}{\Delta\theta} \cdot \frac{1}{v} \cos v\theta \right] =$ (8)

$$\frac{-2}{v\Delta\beta}\left[\cos_v\left(\frac{\pi}{2}+\frac{\Delta\theta}{2}\right)-\cos_v\left(\frac{\pi}{2}-\frac{\Delta\theta}{2}\right)\right]$$

$$\frac{\pi}{2}-\frac{\Delta\theta}{2} \quad (9)$$

For smaller values of $\Delta\theta$ $$\cos_v\left(\frac{\pi}{2}+\frac{\Delta\theta}{2}\right)\approx(-1)^{\frac{v-1}{2}}v\frac{\Delta\theta}{2} \quad (10)$$

and $\cos_v\left(\frac{\pi}{2}-\frac{\Delta\theta}{2}\right)\approx-(-1)^{\frac{v-1}{2}}v\frac{\Delta\theta}{2}$ so that $B_{vb}=$ (11)

$$\frac{2}{v\Delta\theta}\left[v\frac{\Delta\theta}{2}-\left(-v\frac{\Delta\theta}{2}\right)\right]=\pm\frac{2}{v\Delta\theta}v\Delta\theta=\pm 2$$

where the + sign is valid for $v=1,5,9,\ldots$ and the − sign for $v=3,7,11,\ldots$.

It is therefore clear from the last equation that the amplitudes of all odd harmonics of the reference winding 9 are mutually equal in absolute value and have the value two.

We now make use of the recognition that the winding factors $\xi_v$ of a winding which is to be studied, being distributed in accordance with any desired distribution function $f(\theta)$ and having a total conductor cross-section $\pi$ per pole and phase can be expressed by the ratio between the amplitudes of the harmonics of the winding to be studied and the amplitudes of the corresponding harmonics of the reference winding. But this ratio is equal to the ratio between the Fourier coefficients $B_v$ of the said distribution function $f(\theta)$ and the corresponding Fourier coefficients $B_{vb}$ of the reference distribution function $f_b(\theta)$. However, since all the Fourier coefficients $B_{vb}$ of the reference distribution function $f_b(\theta)$ for odd values of $v$ have the absolute value two, the winding factors of a winding to be studied which is distributed in accordance with a distribution function $f(\theta)$ can be expressed by half its Fourier coefficients $B_v$. The equation $$\xi_v=B_v/2$$

is therefore valid. When the winding factors $\xi_{vb}$ of the reference winding 9 are now calculated in accordance with this formula, we obtain:

$$\xi_{vb}=\frac{B_v}{2}=\frac{2}{2}=1$$

i.e. all the winding factors of the reference winding have the absolute value 1. This was obviously to be expected.

Figures 8, 9:
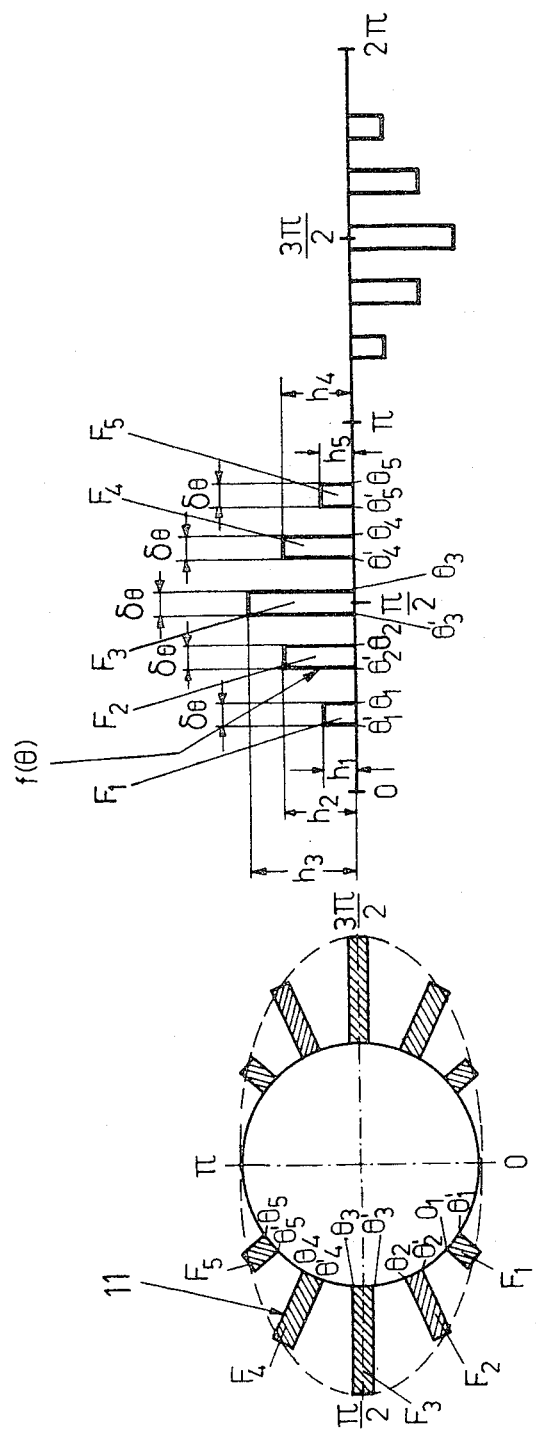
FIG. 8 shows any single-phase winding arrangement, in which the total conductor cross-section is distributed according to a predetermined desired distribution function.
FIG. 9 shows the distribution function for the winding arrangement according to FIG. 8.

The winding factors $\xi_v$ of an exemplary winding 11 illustrated in FIG. 8 will now be determined, this being distributed in accordance with any desired distribution function $f(\theta)$, although the total conductor cross-section per pole and phase is "normalized"—i.e. it has the value $\pi$.

The mathematical representation of the winding 11 to be examined, illustrated in FIG. 8, is shown in FIG. 9, and exhibits strips $F_1$ to $F_5$ corresponding to conductor cross-sections, positioned at the angles $\theta'_1, \theta_1, \theta'_2, \theta_2, \theta'_3, \theta_3, \theta'_4, \theta_4, \theta'_5$ and $\theta_5$. The common width of all the strips $F_1$ to $F_5$ is designated by $\delta\theta$, whereas their height dimensions are designated by $h_1, h_2, h_3, h_4$ and $h_5$. As previously mentioned, the distribution function $f(\theta)$ of the winding 11 to be examined must satisfy the condition $$\int_0^\pi f(\theta)d\theta=\pi,$$

i.e. the total conductor cross-section per pole and phase must have the value $\pi$, as was also the case of the reference winding 9.

Any winding 11 to be examined, which occurs in practice, must, of course, have the partial cross-sections $F_1$ to $F_5$ composed of whole numbers of individual conductors. If the radial height dimension of a conductor is $h_L$, the numbers of conductors of the partial cross-sections $F_1$ to $F_5$ have the values $n_1, n_2, n_3, n_4, n_5$, the total number of conductors per pole and phase is N and the total conductor cross-section per pole and phase is $F_G$, then the following equations are valid:

$$h_1=n_1h_L; h_2=n_2h_L; h_3=n_3h_L; \quad (12)$$
$$h_4=n_4h_L; h_5=n_5h_L$$
$$F_G=\delta\theta(h_1+h_2+h_3+h_4+h_5)$$
$$=\delta\theta(n_1h_L+n_2h_L+n_3h_L+n_4h_L+n_5h_L)$$
$$=h_L\delta\theta(n_1+n_2+n_3+n_4+n_5)$$
$$=Nh_L\delta\theta=\pi, \text{ or } h_L=\frac{\pi}{N\delta\theta}$$
$$h_1=n_1\frac{\pi}{N\delta\theta}, h_2=n_2\frac{\pi}{N\delta\theta}, h_3=n_3\frac{\pi}{N\delta\theta},$$
$$h_4=n_4\frac{\pi}{N\delta\theta}, h_5=n_5\frac{\pi}{N\delta\theta}$$

The function $f(\theta)$ can therefore be expressed mathematically as follows and equals:

(13)

$$h_1=n_1\frac{\pi}{N\delta\theta}, \theta_1'^1<\theta<\theta_1; h_2=n_2\frac{\pi}{N\delta\theta}, \theta_2'^1<\theta<\theta_2$$
$$h_3=n_3\frac{\pi}{N\delta\theta}, \theta_3'^1<\theta<\theta_3; n_4=\frac{\pi}{N\delta\theta}, \theta_4'^1<\theta<\theta_4;$$
$$h_5=n_5\frac{\pi}{N\delta\theta}, \theta_5'^1<\theta<\theta_5$$

As previously mentioned, the winding factors $\xi_{98}$ of the winding 11 distributed in accordance with the distribution function $f(\theta)$ corresponds to half the Fourier coefficients of the function $f(\theta)$;

$$\xi_v=\tfrac{1}{2}B_v=\tfrac{1}{2}\frac{2}{\pi}\int_0^\pi f(\theta)\sin v\theta d\theta \quad (14)$$
$$=\frac{1}{\pi}\frac{\pi}{vN\delta\theta}\sum_{i=1}^{i=5}[n_i\cos v\theta]_{\theta_i'}^{\theta_i}$$
$$=\frac{1}{vN\delta\theta}\sum_{i=1}^{i=5}n_i(\cos v\theta_i-\cos v\theta_i^1)$$

This last equation therefore makes it possible to calculate the winding factors $\xi_v$ of any desired winding 11, of which the numbers of the conductors vary in accordance with a discontinuous distribution function $f(\theta)$.

Figures 10, 11, 12, 13:
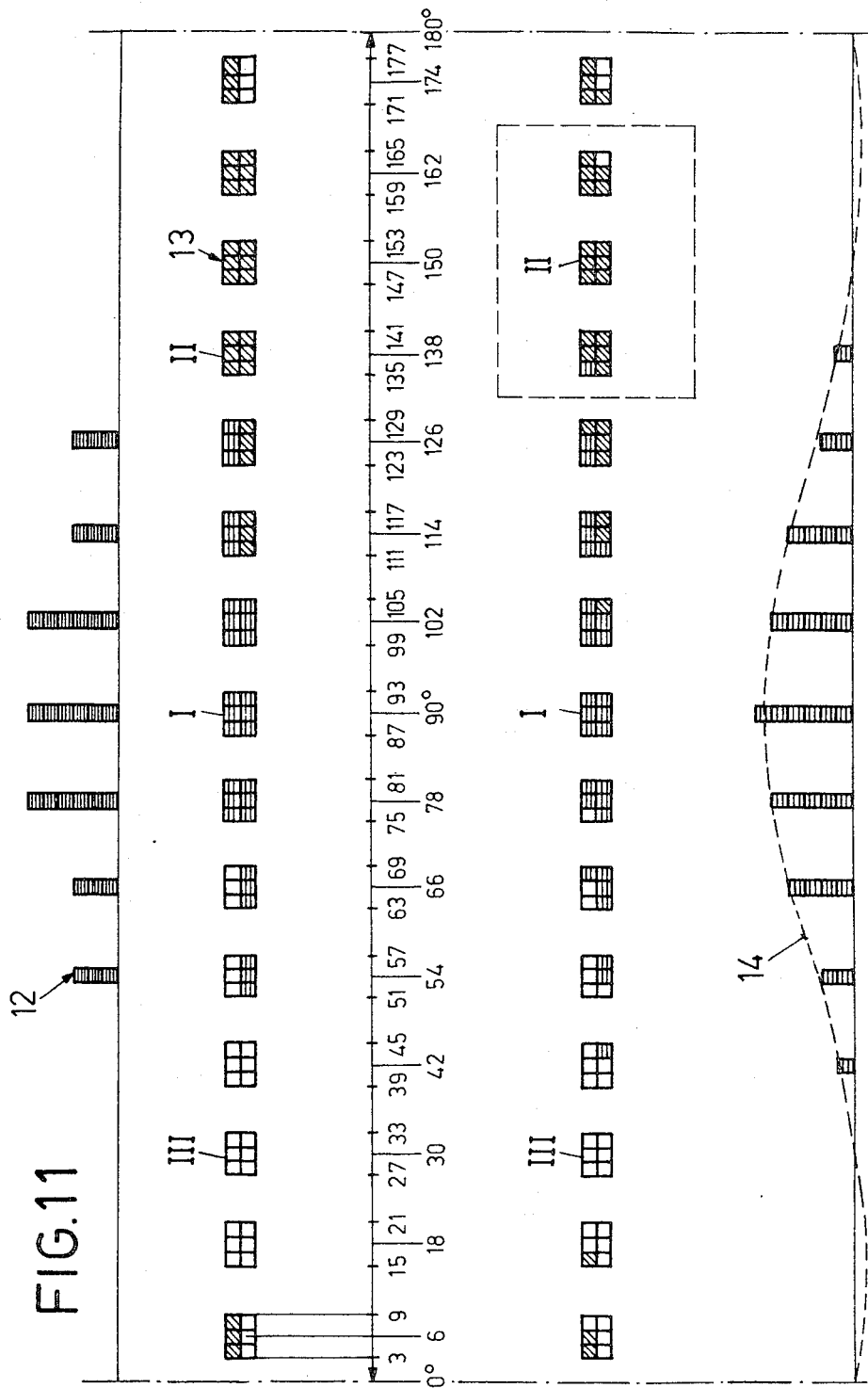
FIG. 10 shows a development view of a conventional three-phase two-layer winding.
FIG. 11 shows the distribution function for the winding according to FIG. 10.
FIG. 12 shows a developed view of a winding constructed according to the invention, in which the total conductor cross-section is distributed according to a predetermined desired distribution function.
FIG. 13 shows the distribution function for the winding according to FIG. 12.

On the basis of this equation, the winding 12 illustrated in FIG. 12, arranged according to the invention and distributed approximately in accordance with a distribution function $f(\theta)$ illustrated in FIG. 13, was compared with the conventional two-layer winding 13 illustrated in FIG. 10, the distribution function of which is illustrated in FIG. 11. It should be observed here that the distribution function of FIG. 13 was chosen so that its envelope curve 14 approximately satisfies the equation $y=\sin\theta-\tfrac{1}{2}\sin 3\theta$.

In the two-layer winding 13, the whole or one-half of the conductor cross-section arranged in a winding position is associated with a phase I, II or III, whereas in the winding 12 according to FIG. 12, 1/6, 2/6, 4/6, 5/6 or 6/6 of the said conductor cross-section are associated with a phase I, II or III. The winding factors determined for the two arrangements are listed in the following table.

| | Winding factors $\xi_\nu$ | |
|---|---|---|
| $\nu$ | Two-layer winding (prior art) | Winding according to the invention |
| 1 | 0.9353 | 0.9217 |
| 5 | 0.0988 | 0.0659 |
| 7 | 0.0153 | 0.0062 |
| 11 | 0.0693 | 0.0078 |
| 13 | 0.0866 | 0.0206 |
| 17 | 0.0817 | 0.0225 |
| 19 | 0.0617 | 0.0070 |
| 23 | 0.0121 | 0.0049 |
| 25 | 0.0738 | 0.0492 |
| 29 | 0.6154 | 0.6065 |
| 31 | 0.5758 | 0.5268 |
| 35 | 0.0527 | 0.0351 |

It is clear from the table that the winding factors of the fundamental waves of the two windings scarcely differ from one another, whereas the winding factors of the harmonics exhibit considerably lower values in the case of the winding according to the invention. This fact is of considerable importance and constitutes the "raison d'etre" of the invention. The invention therefore offers much greater possibilities from the standpoint of varying and reducing its harmonics content than the known arrangements. The number $N_L$ of the conductors per bundle may be the same or variable along the circumference of the cylinder surface upon which the bundles are arranged, and the conductors of a bundle can be associated with the different phases in any desired fractions $N_{LP}$ within the limits imposed by the number $N_L$ of the conductors per bundle. At the same time, the distribution function $f(\theta)$ is likewise freely selective within the scope of the said limits, so that it is possible with comparative ease to satisfy the desiderata which arise in practice, and which refer to the harmonic and the fundamental wave of the arrangement.

I claim:

1. An air-gap winding having at least three phases wherein the conductors extending in the axial direction of the machine are embedded in an electrically insulating cylinder which serves as the winding support, the improvement wherein at least some of the conductors are concentrated as conductor bundles which lie at least approximately upon at least one cylindrical surface which extends between the outer and inner surfaces of said winding support and coaxially with the latter and the number of the conductors per conductor bundle is constant along the circumference of said cylindrical surface and wherein the number of conductor bundles on said cylindrical surface is a whole multiple of twice the number of phases, said conductors being located within said electrically insulating cylinder at varying angular distances between two adjacent conductors, at least some of said bundles comprising more than two conductors, each of the conductors being insulated with respect to one another, and wherein at least two phases are carried by the mutually insulated conductors of at least one of said bundles in an other than equal relative arrangement, the conductors of each bundle being proportionately electrically associated with one or more phases of the machine winding in accordance with a distribution function determined according to the harmonic content and the fundamental wave of the electrical machine with respect to the angular position of the bundle.

2. An air-gap winding having at least three phases wherein the conductors extending in the axial direction of the machine are embedded in an electrically insulating cylinder which serves as the winding support, the improvement wherein at least some of the conductors are concentrated as conductor bundles which lie at least approximately upon at least one cylindrical surface which extends between the outer and inner surfaces of said winding support and coaxially with the latter and the number of conductors per conductor bundle varies along the circumference of said cylindrical surface and wherein the number of conductor bundles having the same number of conductors per conductor bundle on said cylindrical surface is a whole multiple of twice the number of phases, said conductors being located within said electrically insulating cylinder at varying angular distances between two adjacent conductors, at least some of said bundles comprising more than two conductors, each of the conductors being insulated with respect to one another, and wherein at least two phases are carried by the mutually insulated conductors of at least one of said bundles in an other than equal relative arrangement, the conductors of each bundle being proportionately electrically associated with one or more phases of the machine winding in accordance with a distribution function determined according to the harmonic content and the fundamental wave of the electrical machine with respect to the angular position of the bundle.

3. An air-gap winding having at least three phases wherein the conductors extending in the axial direction of the machine are embedded in an electrically insulating cylinder which serves as the winding support, the improvement wherein at least some of the conductors are concentrated as conductor bundles which lie at least approximately upon at least one cylindrical surface which extends between the outer and inner surfaces of said winding support and coaxially with the latter and individual conductors are provided which lie on at least one cylindrical surface and wherein the number of conductors which lie on said surface is a whole multiple of twice the number of phases, said conductors being located within said electrically insulating cylinder at varying angular distances between two adjacent conductors, at least some of said bundles comprising more than two conductors, each of the conductors being insulated with respect to one another, and wherein at least two phases are carried by the mutually insulated conductors of at least one of said bundles in an other than equal relative arrangement, the conductors of each bundle being proportionately electrically associated with one or more phases of the machine winding in accordance with a distribution function determined according to the harmonic content and the fundamental wave of the electrical machine with respect to the angular position of the bundle.

4. A multi-phase air-gap winding of an electric machine having at least three phases, comprising:
a winding support including an electrically insulating cylinder having an outer and an inner surface; and a plurality of conductors each extending axially of the electrical machine and within the winding support, at least some of the conductors being arranged into conductor bundles lying substantially on at least one cylindrical surface extending between the outer and inner surfaces of the winding support wherein the number of conductors per conductor bundle is constant and wherein the number of conductor bundles is an integer multiple of twice the number of phases of the electrical machine, a plurality of said bundles having more than two conductors each mutually insulated with respect to one another, at least one of said bundles carrying at least two phases in an other than equal relative arrangement among the conductors of the bundle and another of said bundles carrying a different set of at least two phases in an other than equal relative arrangement among the conductors of the bundle, each conductor of each bundle being assigned to one of the machine phases in accordance with a distribution function determined according to the harmonic content and the fundamental wave of the electrical machine with respect to the angular position of the bundle.

5. A multi-phase air-gap winding of an electric machine having at least three phases, comprising:
a winding support including an electrically insulating cylinder having an outer and an inner surface; and,
a plurality of conductors each extending axially of the electrical machine and within the winding support, at least some of the conductors being arranged into conductor bundles lying substantially on at least one cylindrical surface extending between the outer and inner surfaces of the winding support, wherein the number of conductors per conductor bundle varies along the circumference of the cylindrical surface and wherein the number of conductor bundles having the same number of conductors per conductor bundle on said cylindrical surface is an integer multiple of twice the number of phases of the electrical machine, a plurality of said bundles having more than two conductors each mutually insulated with respect to one another, at least one of said bundles carrying at least two phases in an other than equal relative arrangement among the conductors of the bundle and another of said bundles carrying a different set of at least two phases in an other than equal relative arrangement among the conductors of the bundle, each conductor of each bundle being assigned to one of the machine phases in accordance with a distribution function determined according to the harmonic content and the fundamental wave of the electrical machine with respect to the angular position of the bundle.

6. An air-gap winding having at least three phases wherein the conductors extending in the axial direction of the machine are embedded in an electrically insulating cylinder which serves as the winding support, the improvement wherein at least some of the conductors are concentrated as conductor bundles which lie at least approximately upon at least one cylindrical surface which extends between the outer and inner surfaces of said winding support and coaxially with the latter, said conductors being located within said electrically insulating cylinder at varying angular distances between two adjacent conductors, at least some of said bundles comprising more than two conductors, each of the conductors being insulated with respect to one another, and wherein at least two phases are carried by the mutually insulated conductors of at least one of said bundles in an other than equal relative arrangement, the conductors of each bundle being proportionately electrically associated with one or more phases of the machine winding in accordance with a distribution function determined according to the harmonic content and the fundamental wave of the electrical machine with respect to the angular position of the bundle, and wherein some of said conductor bundles include a plurality of conductors located in each of two different radial positions, and different ones of the plurality of conductors in one of the radial positions are associated with different phases of the electrical machine.

7. A multi-phase air gap winding of an electric machine having at least three phases, comprising:
a winding support including an electrically insulating cylinder having an outer and an inner surface; and,
a plurality of conductors each extending axially of the electrical machine and within the winding support, at least some of the conductors being arranged into conductor buncles lying substantially on at least one cylindrical surface extending between the outer and inner surfaces of the winding support, a plurality of said bundles having more than two conductors each mutually insulated with respect to one another, at least one of said bundles carrying at least two phases in an other than equal relative arrangement among the conductors of the bundle, each conductor of each bundle being assigned to one of the machine phases in accordance with a distribution function determined according to the harmonic content and the fundamental wave of the electrical machine with respect to the angular position of the bundle, and wherein some of said conductor bundles include a plurality of conductors located in each of the two different radial positions, and different ones of the plurality of conductors in one of the radial positions are associated with different phases of the electrical machine.

* * * * *